Jan. 14, 1958 E. W. HINES 2,819,976
EXPANDABLE POPCORN PACKAGE
Filed Dec. 27, 1954 2 Sheets-Sheet 1

INVENTOR.
Eugene W. Hines
BY
Harness, Dickey & Pierce
ATTORNEYS

Jan. 14, 1958     E. W. HINES     2,819,976
EXPANDABLE POPCORN PACKAGE
Filed Dec. 27, 1954     2 Sheets-Sheet 2
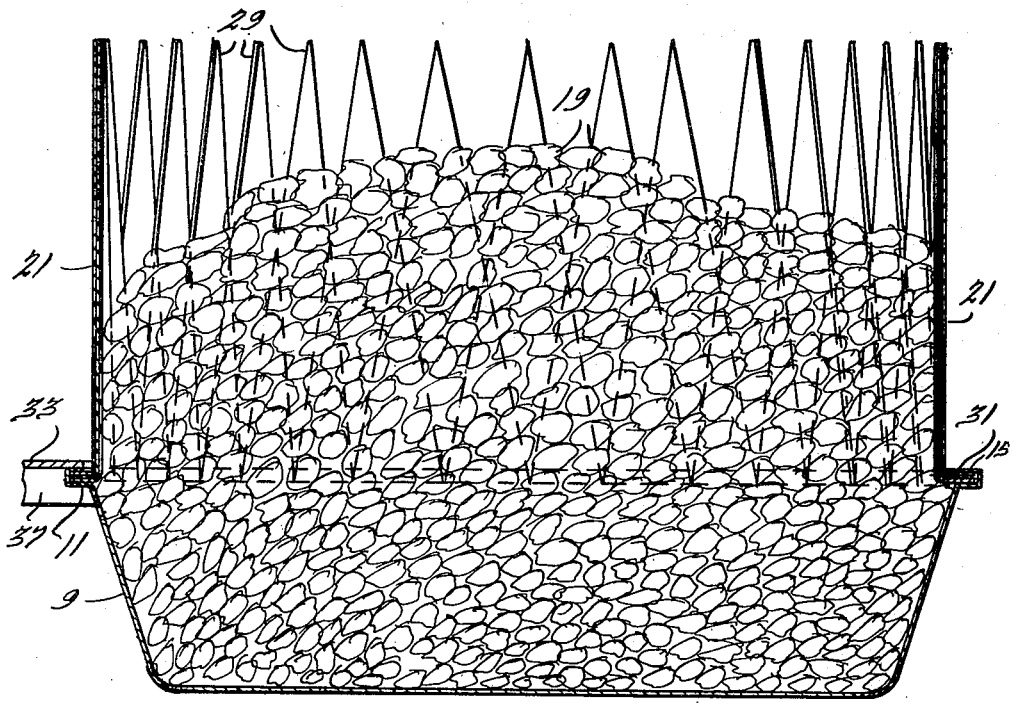
Fig. 4.
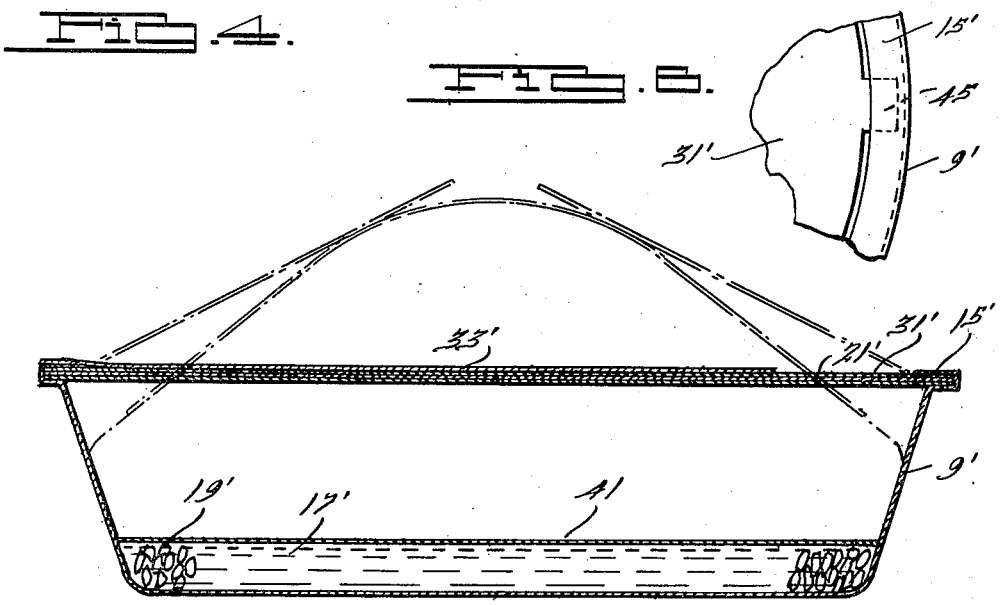
Fig. 6.
Fig. 5.
INVENTOR.
Eugene W. Hines.
BY
Harness, Dickey & Pierce.
ATTORNEYS.

United States Patent Office 2,819,976
Patented Jan. 14, 1958

2,819,976

EXPANDABLE POPCORN PACKAGE

Eugene W. Hines, Lambeth County, Ontario, Canada

Application December 27, 1954, Serial No. 477,669

14 Claims. (Cl. 99—171)

This invention relates generally to food packages and more particularly to food packages in which food such as popcorn may be cooked or popped.

It is an object of this invention to provide a food package of the aforementioned type which is extremely attractive in appearance, relatively inexpensive to manufacture, which may be manufactured with a minimum of special equipment and machinery, and which is especially efficient in use for the popping of corn or the like.

It is a further object of this invention to provide a food package of the aforementioned type which may be readily sealed with food such as corn and oil therein, so that the same will be kept in a sanitary condition, and which may be placed over a source of heat and the food, such as corn, popped or cooked in the package and without requiring the use of any additional utensils, tools, or the like.

It is a still further object of this invention to provide a food package of the aforementioned type which will automatically be opened by the action of the corn popping within the package, but which will retain all of the popped corn therein so that the same cannot accidentally or inadvertently spill therefrom.

It is a still further object of this invention to provide a food package of the aforementioned type which is so attractive in appearance and so constructed that it may be used to serve the cooked food, such as popcorn, in addition to acting as a shipping package and a cooking utensil.

It is a still further object of this invention to provide, in a food package of the aforementioned type, improved container closure means which will automatically open when food, such as popcorn, is cooked.

These and other objects of this invention will become apparent from the following detailed description, taken in conjunction with the accompanying drawings, in which:

Fig. 4 is a view similar to Fig. 3 and illustrating the package in its fully opened position, with popcorn popped therein;

Fig. 5 is a sectional view of a further embodiment of the invention, illustrating the package in its closed position in solid lines and in a partially open position in dot and dash lines; and Fig. 6 is a partial plan view of the structure illustrated in Fig. 5.

Figure 1:
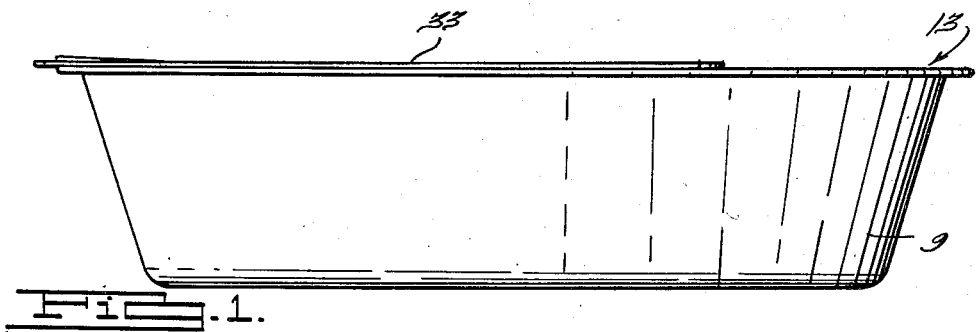
Figure 1 is a side elevational view of a package of this invention in its closed or shipping condition.
Figure 2:
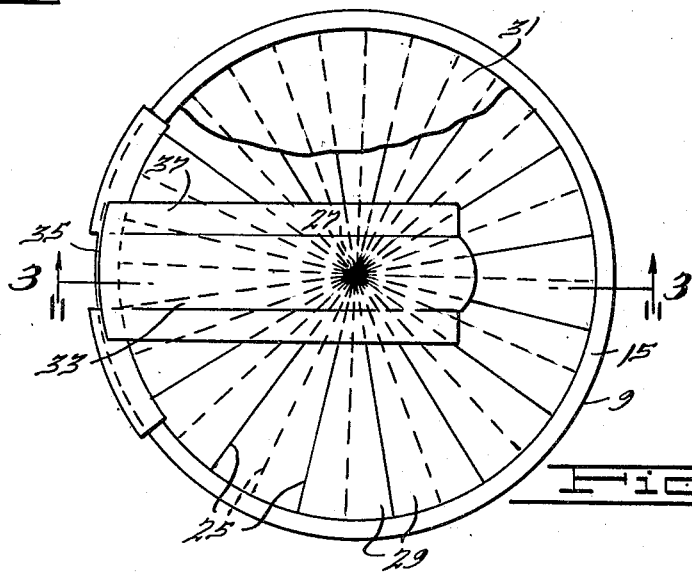
Fig. 2 is a top plan view of the structure illustrated in Fig. 1.

Referring now to the drawings and more particularly to Figs. 1–5, it will be seen that the food package includes a panlike container 9 made of suitable sheet material such as aluminum and having an open top. The panlike container 9 is provided with a peripheral flange 11 extending around the top thereof and on which the peripheral portion of a cover or closure means 13 rests. The outer portion of the flange 11 is, at 15, bent over the peripheral portion of the cover or closure means 13 so as to secure the peripheral portion of the closure means to the container.

While the container may be used to package and cook various types of food, it is illustrated as being used in connection with corn to be popped. Cooking oil 17 is therefore disposed in the container 9 and kernels 19 of corn to be popped are placed in the cooking oil. Suitable spices may, of course, be added so that when the corn is popped in the package it will be ready for consumption without any additional flavoring or work.

The closure means 13 illustrated includes two disk-shaped sheets or cover members 21 and 23. The cover members may be made of any suitable material, but relatively thin cardboard or paper, backed on the underside by a thin sheet of aluminum, for sanitation purposes, has been found to be satisfactory. Each of the cover members 21 and 23 is illustrated as being slit along radial lines 25 extending inwardly from adjacent the outer periphery thereof toward a central point 27 to provide a plurality of side-by-side cover sections or segments 29. The sections 29 of the cover member 21 are staggered or offset circumferentially from the complemental sections 29 of the cover member 23 so that the sections of the two cover members overlap each other, as can be clearly seen in Fig. 2. The radial lines 25 terminate adjacent the outer periphery of their cover member and adjacent the inner edge of the container flange portion 15 so that each section 29 is hingedly connected with the container 9 adjacent its outer edge. If the cover members 21 and 23 are made from relatively heavy or thick material, it may be necessary to score the same adjacent the outer edge of each section, but it has been found that scoring is not necessary when the cover members are made of material which is rigid enough to stand by itself but which can be bent relatively easily. When the cover members 21 and 23 are in their normal closure position, their sections or segments 29 lie in a substantially flat plane, as illustrated, and a sealing cover 31 of "cellophane," a rubber hydrochloride film such as "Pliofilm," sheet aluminum, or paper may be extended across the entire cover structure and crimped under the container flange portion 15 or otherwise secured to the container flange or top cover member in any suitable manner, to positively seal the interior of the container from the atmosphere for sanitation purposes.

It should also be noted that a handle structure 33, of any suitable type, is provided, which is hingedly connected to the container at 35 and normally folded flat on top of the sealing cover 31. The entire package may then be inserted into a suitable cardboard sleeve or container, so that during shipping the package will not be damaged. If the Pliofilm sealing cover is used it is not necessary to remove the same before the cooking operation, as Pliofilm will, upon the application of heat, become plastic or fluidlike and thus permit the cover sections to swing upwardly. Other types of sealing covers which will automatically open may be used, and one such cover will be described in connection with a later embodiment. Before the cooking operation the handle 33 is bent outwardly and handle flange portions 37 are bent downwardly so as to engage the wall of the container to provide a handle which can be used for shaking the container during the corn popping operation, as well as to lift or move the container.

Figure 3:
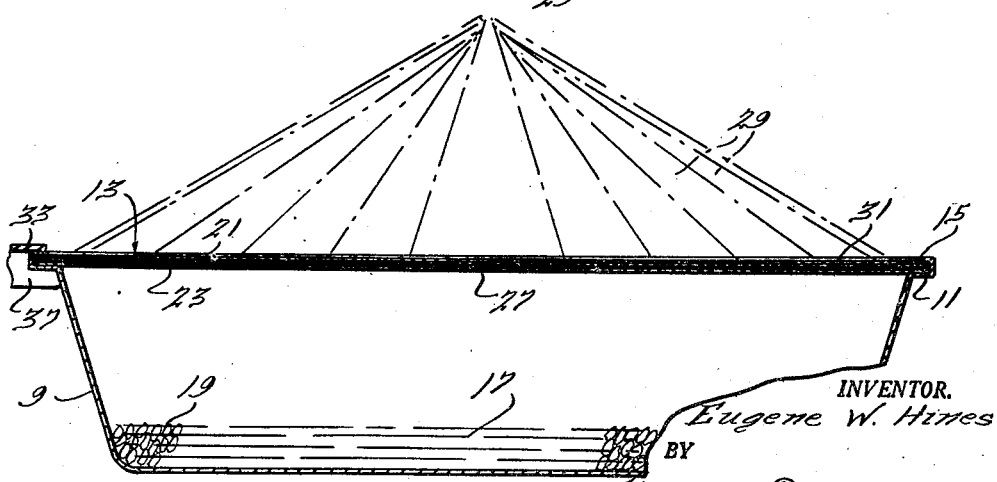
Fig. 3 is an enlarged sectional view of the structure illustrated in Fig. 2, taken along the line 3—3 thereof and illustrating the cover in a partially opened condition.

When it is desired to cook the food in the package, such as popcorn, the container is set on a suitable source of heat and thereafter the kernels 19 of corn will pop or expand and as the expansion takes place the segments or sections 29 will be forced upwardly about their hinged outer edges or peripheral portions to the position illustrated in Fig. 3, and when the popcorn is fully popped the segments or sections 29 will be in a generally vertical or upstanding position, as illustrated in Fig. 4, thus providing an upstanding fence or wall structure extending above and around the container 9, which will retain the popped corn in the package and prevent it from falling therefrom. The kernels of corn which first pop will provide a cover or blanket over the remaining unpopped kernels so that as these latter kernels pop they will not fly up and be ejected from the package. That is, the kernels which popped when the cover members were fully or partially closed will act as a blanket to hold down the kernels which pop when the cover is fully or substantially open.

As can be best seen in Fig. 4, due to the provision of two cover members 21 and 23 and the overlapping relationship of the sections or segments 29 thereof, the spaces or openings between the segments or sections will be small enough that the popped corn cannot fall or pass therethrough and will be retained in the package. Furthermore, the two cover members act to prevent any hot oil from splattering or escaping from the package during the cooking operation. However, only one cover may be used if the cover is slit to provide very narrow sections 29, which, when upstanding, will have small enough spaces therebetween to prevent the popped corn from falling from the package and to prevent hot oil from escaping from the package.

It will be appreciated that while the container is illustrated as being of a circular shape, it could be of any desired shape such as, for example, triangular, rectangular, or any other polygonal shape, with the sections extending inwardly from the outer periphery or edges and hinged in the same manner as described, so that they can open up to provide an upstanding fence or wall around the container to accommodate the expanded volume of the food in the container after the cooking operation.

In the embodiment illustrated in Fig. 6, only one cover member 21' is illustrated, which is constructed identically with the cover 21 previously described, and is slit to provide the various sections. The cover member may be slit to provide more sections, which are narrower than those shown in the previous embodiment. If the cover is so slit, the spaces between the sections are smaller and the popped corn is more positively retained in the package. The cover is connected with the container 9' by the flange portion 15' as previously described, and a handle structure 33' is provided. However, in place of the lower cover 23 a thin sheet of aluminum 41 is laid on top of the kernels of corn 19' and oil 17'. As the kernels of corn pop the sheet will act as a flexible cover or sheet on top of the corn and will cooperate with the cover member 21 to prevent hot oil from splattering from the package during the popping operation. In this embodiment the sealing cover 31' is illustrated as being a circular disk of paper or aluminum foil, the diameter of which is slightly less than the inside diameter of the flange portion 15'. The sealing cover 31' is provided with a plurality of circumferentially spaced tabs 45 projecting radially outwardly from the peripheral edge thereof and disposed under the crimped flange portion 15'. The sealing cover is thus held in place by the frictional engagement of the tabs 45 with the flange portion 15' and the top cover member. When the corn is popped so that the sections 29' of the cover member 21' swing upwardly the force will be sufficient to pull the tabs 45 away from the container flange and the sealing cover can be lifted from the package or will merely fall away therefrom.

In any event, it will be appreciated that the corn can be popped in the same package in which it is shipped and that an unusual effect is obtained in the unfolding or opening of the various segments of the cover. Likewise, the cover opens automatically and provides an attractive crownlike effect on the container so that popcorn may be served directly therefrom.

Furthermore, it will be appreciated that it is a relatively simple matter to slit and form the cover members to provide the various sections or segments and it is a relatively simple matter to assemble the cover members with the container.

Furthermore, it will be appreciated that even after the popping operation the cover members may be removed from the container and the container may then be reused for frozen food or other food storage purposes.

What is claimed is:

1. A food package in which food may be cooked, including an open top pan type container in which the food to be cooked may be placed, cover means normally closing the top of said container and including a plurality of sheet sections hingedly secured at their outer edges with said container and extending inwardly from said outer edges toward each other, said sections normally being disposed in a generally flat plane and closing the top of said container and being actuatable to swing upwardly out of said plane to provide a package in which said container top will be open and said sections will be disposed in a generally upstanding position around the periphery of said container.

2. A food package in which food may be cooked, including an open top pan type container in which the food to be cooked may be placed, cover means normally closing the top of said container and including a plurality of sheet sections hingedly secured at their outer edges with said container and extending inwardly from said outer edges toward each other, said sections normally being disposed in a generally flat plane and closing the top of said container and being actuatable to swing upwardly out of said plane to provide a package in which said container top will be open and said sections will be disposed in a generally upstanding position around the periphery of said container, and additional movable means disposed above the bottom of said container and below said cover means, cooperating with said cover means to retain food in said package during a cooking operation.

3. A food package in which food may be cooked, including an open top pan type container in which the food to be cooked may be placed, cover means normally closing the top of said container and including a plurality of sheet sections hingedly secured at their outer edges with said container and extending inwardly from said outer edges toward each other, said sections normally being disposed in a generally flat plane and closing the top of said container and being actuatable to swing upwardly out of said plane to provide a package in which said container top will be open and said sections will be disposed in a generally upstanding position around the periphery of said container, and a rubber hydrochloride film covering said sections when the same are disposed in said flat plane which will, when subjected to cooking heat, permit said sections to swing upwardly.

4. A food package in which food may be cooked, including an open top pan type container in which the food to be cooked may be placed, means normally closing the top of said container, said closure means including a first group of sheet sections hingedly connected with said container adjacent their outer edges and extending inwardly from said outer edges toward each other and a second group of sheet sections disposed below said first group of sheet sections and hingedly secured to said container adjacent the outer edges thereof and extending inwardly from said outer edges toward each other, the adjacent edges of said second group of sections being offset from the adjacent edges of the sections of said first group of sections, said sections of each group being normally disposed in a flat plane and closing the top of said container, whereby when food within the container is cooked and expanded, said sections can move upwardly out of a generally horizontal closure position to a generally vertical open position to provide an upstanding structure extending around the periphery of said container to aid in retaining the cooked food therein.

5. A food package in which food may be cooked, including an open top pan type container in which the food to be cooked may be placed, a thin sheet of material disposed in said container above the bottom thereof and on top of any food therein, container cover means including a plurality of sheet sections hingedly connected adjacent their outer edges with said container and extending inwardly from said outer edges toward each other, said sections being normally disposed in a generally horizontal closure position and being actuatable to swing upwardly about their hinge connections to provide a generally upstanding structure extending above and around the pan type container.

6. A food package in which food may be cooked, including an open top pan type container in which the food to be cooked may be placed, means normally closing the top of said container, said means including a sheet cover secured adjacent its outer periphery to said container and normally being disposed in a generally flat plane closing the top of said container, said cover member being slit to provide a plurality of adjacent, side-by-side sections separated along lines extending inwardly from adjacent the outer edge of said cover and toward each other so that said sections can swing upwardly about their outer peripheral portions to provide an open food package with the closure sections extending generally upwardly relative to the container.

7. A food package in which food may be cooked, including an open top pan type container in which the food to be cooked may be placed, means for normally closing the top of said container, said closure means including a pair of sheet members disposed one on top of each other, which are secured adjacent their outer peripheries to said container, each of said sheet members being slit along lines extending inwardly and toward each other from adjacent the outer periphery of each member, so that said sections are hinged adjacent the outer peripheries of said members and can swing upwardly to a generally vertical position to provide an open top container having a closure structure extending around the periphery thereof, the sections of one member being offset relative to the sections of another member so as to be in an overlapping position relative to each other.

8. A food package in which food may be cooked, including an open top pan type container in which the food to be cooked may be placed, closure means closing the top of said container and being normally disposed in a generally flat plane, said closure means including a sheet cover member connected with said container and divided into a plurality of hinged sections adapted to open into an upright fence type structure extending around said container in a generally upstanding position.

9. A food package in which food may be cooked, including a sheet metal pan type container in which food to be cooked may be placed, said container being open at the upper end thereof, means normally closing the top of said container, said closure means including a pair of sheet cover members disposed in a superimposed relationship relative to each other and secured adjacent their outer peripheries to said container, each of said cover members being of a generally circular shape and being slit along radial lines extending toward the outer peripheries thereof to a central point thereof, so as to provide a plurality of segments adapted to swing upwardly and outwardly about the peripheral portions secured to said container upon the application of pressure from within the container, the segments of one of said members being staggered relative to the segments of the other member, so that when said segments open to a generally upstanding position the segments of said members provide an upstanding fence type structure extending around and about said container.

10. A package in which popcorn may be popped, including an open top pan type container, a cooking oil in said container, kernels of corn in said oil, and means normally closing the top of said container, said closure means including a plurality of sheet sections hingedly secured at their outer edges with said container and extending inwardly from said outer edges toward each other, said sections normally being disposed in a generally flat plane and closing the top of said container, said kernels of corn being adapted to be expanded into popped corn upon the application of heat to said container and upon such expansion to cause said sections to swing upwardly out of their generally flat plane to a generally upstanding position around the periphery of said container.

11. A package in which popcorn may be popped, including an open top pan type container, a cooking oil in said container, kernels of corn in said oil, means normally closing the top of said container, said closure means including a plurality of sheet sections hingedly secured at their outer edges with said container and extending inwardly from said outer edges toward each other, said sections normally being disposed in a generally flat plane and closing the top of said container, said kernels of corn being adapted to be expanded into popped corn upon the application of heat to said container and upon such expansion to cause said sections to swing upwardly out of their generally flat plane to a generally upstanding position around the periphery of said container, and additional movable means disposed above the kernels of corn and below said closure means cooperating with the latter to retain the cooking oil in said package during the corn popping operation.

12. A package in which corn can be popped, including an open top pan type container, cooking oil disposed in said container, kernels of corn disposed in said cooking oil, means normally closing the top of said container, said closure means including a pair of sheet cover members disposed in superimposed relationship relative to each other and secured adjacent their outer peripheries to said container, each of said cover members being slit along lines extending inwardly and toward each other from adjacent the outer edge of said member so that each member includes a plurality of sections normally disposed in a generally flat plane to close the top of said container and adapted to swing upwardly and outwardly about their outer edges to a generally upstanding position around said container, the sections of one of said members being offset relative to the sections of the other member, whereby when the corn in the container is heated it will pop and upon expansion will cause the sections to swing upwardly to their upstanding positions and the upstanding sections will retain the popped corn in said package.

13. A food package in which food may be cooked, including an open top pan type container in which food to be cooked may be placed, said container having a peripheral flange extending around the top thereof, closure means closing the top of said container and being normally disposed in a generally flat plane, said closure means including a sheet cover member resting upon the inner peripheral portion of said container flange, said sheet cover member being divided into a plurality of hinged sections adapted to open into an upright fence type structure extending around said container in a generally upstanding position, a second sheet cover member resting upon the first sheet cover member, the peripheral edges of said second cover member being disposed inwardly of but adjacent the peripheral edge of said first cover member, said second cover member having a plurality of spaced tabs thereon projecting outwardly from the periphery thereof and terminating adjacent the outer periphery of said first cover member, the outer peripheral portion of said container flange being crimped over said second cover tabs and said first cover member peripheral portion so as to frictionally retain said cover members in an assembled relationship on said container.

14. A food package in which food may be cooked, including an open top pan type container in which the food to be cooked may be placed, closure means closing the top of said container and including cover means connected with said container and having at least a portion thereof adapted to move away from said container upon expansion of the food in the container resulting from cooking, and a sealing cover overlying said cover means and releasably connected with said container so that upon movement of said cover means said sealing cover will be automatically disengaged and moved away from said container.

References Cited in the file of this patent

UNITED STATES PATENTS

| | | |
|---|---|---|
| 2,528,332 | Berquist | Oct. 31, 1950 |
| 2,673,805 | Colman | Mar. 30, 1954 |
| 2,673,806 | Colman | Mar. 30, 1954 |
| 2,702,246 | Kinsella | Feb. 15, 1955 |

FOREIGN PATENTS

| | | |
|---|---|---|
| 567,738 | Great Britain | Feb. 28, 1945 |